ts Patent Office 3,655,870
Patented Apr. 11, 1972

3,655,870
PROCESS FOR THE MANUFACTURE OF A GRANULAR MATERIAL CONTAINING OILY OR LIQUID THERAPEUTICALLY USABLE FURANOSIDES
Guenther Mueller, Arlesheim, Switzerland, assignor to Ciba Corporation, Summit, N.J.
No Drawing. Original application July 25, 1969, Ser. No. 845,038, now Patent No. 3,594,474, dated July 20, 1971. Divided and this application Sept. 18, 1970, Ser. No. 73,606
Claims priority, application Switzerland, Aug. 5, 1968, 11,704/68
Int. Cl. A61j 3/06; A61k 9/00, 27/00
U.S. Cl. 424—80
16 Claims

ABSTRACT OF THE DISCLOSURE

The invention provides a process of manufacture of a free-flowing, solid, granular material, wherein an oily or liquid, therapeutically usable furanoside, such as ethyl-3,5,6-tri-O-benzyl-D-glucofuranoside or ethyl-3-O-propyl-5,6-di-O-para-chlorbenzyl - D - glucofuranoside, is mixed with a film-forming agent and a lower alkanol, the mixture is worked up with magnesium trisilicate to form a plastic mass and the latter granulated while drying it.

CROSS-REFERENCE TO RELATED APPLICATION

This application is divided out of our pending application Ser. No. 845,038, filed July 25, 1969 now U.S. Pat. No. 3,594,474.

The subject of the invention is a process for the manufacture of a granular material containing oily or liquid, therapeutically usable furanosides, especially glucofuranosides.

It is known that the pharmacologically highly active glucofuranosides, especially those of general formula

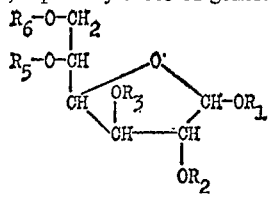

wherein $R_1$ denotes hydrogen, cyclo-lower alkyl, benzyl, lower alkyl, lower alkenyl or hydroxy-lower alkyl residue, primariy an ethyl, hydroxyethyl, dihydroxypropyl, allyl or butyl residue, $R_2$ is lower alkanoyl but primarily represents hydrogen, $R_3$ is a lower alkyl, primarily propyl residue, a lower alkyl or a benzyl residue and $R_5$ and $R_6$ each representing benzyl, or benzyl aromatically substituted by lower alkyl, especially methyl, or halogen, primarily the benzyl residue or the p-methyl or p-chlorobenzyl residue, are mostly oily or liquid in nature and possess an unpleasant flavour. These orally highly active compounds, especially ethyl-3,5,6-tri - O - benzyl-D-glucofuranoside or ethyl - 3-O-propyl-5,6-di-O-p-chlorobenzyl-D-glucofuranoside therefore had to be enclosed in capsules or administered in a liquid form. Administration in a liquid form and also in a capsule form however presents various disadvantages. Thus accurate dosing is practically impossible in the case of the liquid form, and the capsules present manufacturing difficulties. Because these glucofuranosides possess very good solvent properties and plasticiser properties and are furthermore not very stable in most media it did not prove possible, on the other hand, to manufacture solid oral dispensing forms which could be kept for prolonged periods and which at the same time permit accurate dosing.

It has now been found that a free flowing granular material which can easily be processed into solid oral administration forms can be obtained in a simple manner if an oily or liquid therapeutically usable glucofuranoside or other oily or liquid therapeutically usable furanosides are mixed with a film - forming agent and a lower alkanol such as methanol, isopropanol or primarily ethanol, worked into a plastic mass with magnesium trisilicate, if desired together with a further adsorbent such as collodial silica or cellulose, especially microcrystalline cellulose, and the mass granulated whilst drying it, for example with warm air.

As film-forming agents there are preferably used those which also act as binding agents, especially shellac, polyacrylic or methacrylic derivatives, especially their esters, carbowaxes, polyvinyl derivatives such as polyvinyl alcohols or their esters, for example polyvinyl acetates, or primarily polyvinylpyrrolidones, for example polyvinylpyrrolidone or polyvinylpyrrolidone-polyvinyl acetate copolymers. Further possible film-forming agents are alcohol-soluble or water-soluble cellulose derivatives, especially cellulose acetate-phthalate, hydroxypropyl-methyl-cellulose, ethylcellulose, ethyl-hydroxyethyl-cellulose, hydroxy-propyl-cellulose or carboxy-methyl-cellulose.

The process is preferably effected by dissolving the film-forming agent in the lower alkanol, working up the furanoside with this solution, and working up this solution with the magnesium trisilicate and optionally the adsorbent to give a plastic mass, and drying and granulating the latter in the usual manner. When working up the solution of the furanoside with magnesium trisilicate, the sugar is adsorbed on the latter.

The film-forming agent is preferably used in a concentration of 0.2 to 20, especially 1–5 and primarily 2–4, parts by weight relative to 10 parts by weight of furanoside. The magnesium trisilicate is used in an amount which permits adsorption of the furanoside, especially in a concentration of 5–20, preferably 8–15 or primarily about 10–12, parts by weight calculated relative to 10 parts by weight of furanoside. The further adsorbent is used in an amount of 1–20, preferably 1–10 and primarily 4–6, parts by weight calculated relative to 10 parts by weight of furanoside.

A further subject of the present invention is the granular material obtainable according to the process mentioned, which is characterised by containing an oily or liquid, therapeutically usable furanoside adsorbed on magnesium trisilicate and if desired on a further adsorbent, and a film-forming agent. This granular material is stable for prolonged periods even at a higher temperature, for example 60°, and can be easily processed into any desired oral administration form.

The present invention also relates to the use of the abovementioned granular material for the manufacture of solid oral administration forms such as tablets, pushfit capsules or primarily dragées. These may be obtained in the usual manner. These administration forms also form a subject of the invention.

EXAMPLE 1

Composition of the granular material 10 parts by weight of ethyl-3,5,6-tri-O-benzyl-D-glucofuranoside (Glyvenol®), 10 parts by weight of magnesium trisilicate, 5 parts by weight of colloidal silica and 2.5 parts by weight of polyvinylpyrrolidone.

Manufacture of the granular material

The PVP is dissolved in a fourfold amount of alcohol and mixed with the Glyvenol®. This solution is processed into a paste with the magnesium trisilicate in a suitable apparatus and is kneaded with colloidal silica to give a plastic mass. It is then granulated and dried in the usual manner.

Manufacture of dragées 5.45 parts by weight of granular material are mixed with 2.0 parts by weight of starch, 1.7 parts by weight of talc and 0.3 part by weight of magnesium stearate and processed into pressed blanks weighing 585 mg. and containing 200 mg. of ethyl-3,5,6-tri-O-benzyl-D-glucofuranoside.

In order to hide the bad taste, the pressed blanks are, after coating with a protective lacquer, converted into dragées with sugar in the usual manner.

EXAMPLE 2

Composition of the granular material 10 parts by weight of preparation of ethyl-3-O-propyl-5,6-di-O-p-chlorobenzylglucofuranoside, 14 parts by weight of magnesium trisilicate, 5 parts by weight of colloidal silica and 2.5 parts by weight of polyvinylpyrrolidone.

Manufacture of the granular material

The PVP is dissolved in the fourfold quantity of alcohol and mixed with the furanoside. This solution is processed into a paste with magnesium trisilicate in a suitable apparatus and kneaded with colloidal silica to give a plastic mass. The mass is granulated and dried in the usual manner.

Manufacture of dragées 31.5 parts by weight of granular material are mixed with 0.8 part by weight of starch, 1.55 parts by weight of microcrystalline cellulose, 1.05 parts by weight of talc and 0.15 part by weight of magnesium stearate and processed into pressed blanks of 350 mg.=100 mg. of furanoside.

These cores are given a protective lacquer in the usual manner and then converted into dragées with sugar.

EXAMPLE 3

Composition of the granular material 10 parts by weight of ethyl-3,5,6-tri-O-benzyl-D-glucofuranoside (Glyvenol®), 10 parts by weight of magnesium trisilicate, 5 parts by weight of colloidal silica, 0.5 part by weight of polyvinylpyrrolidone, and 2 parts by weight of microcrystalline cellulose.

Manufacture of the granular material

The PVP is dissolved in a fourfold amount of alcohol furanoside (Glyvenol®), 10 parts by weight of magnesium into a paste with the magnesium trisilicate in a suitable apparatus and is kneaded with colloidal silica to give a plastic mass. It is then granulated and dried in the usual manner.

Manufacture of dragées 5.45 parts by weight of granular material are mixed with 2.0 parts by weight of starch, 1.7 parts by weight of talc and 0.3 part by weight of magnesium stearate and processed into pressed blanks weighing 585 mg. and containing 200 mg. of ethyl-3,5,6-tri-O-benzyl-D-glucofuranoside.

In order to hide the bad taste, the pressed blanks are, after coating with a protective lacquer, converted into dragées with sugar in the usual manner.

I claim.

1. Process for the manufacture of a granular material for the manufacture of solid oral administration capsule, dragée and tablet dosage forms containing oily or liquid, therapeutically usable glucofuranoside, wherein an oily or liquid, therapeutically usable orally active furanoside of the formula

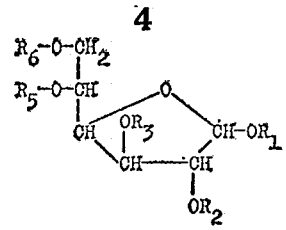

in which $R_1$ represents hydrogen, cyclo-lower alkyl, benzyl, lower alkyl, lower alkenyl or hydroxy-lower alkyl, $R_2$ is lower alkanoyl or hydrogen, and $R_3$ is lower alkyl, lower alkanoyl, hydroxy lower alkyl or benzyl and $R_5$ and $R_6$ are each benzyl or benzyl aromatically substituted by lower alkyl or halogen is mixed with a film-forming binding agent and a lower alkanol, the mixture worked up with magnesium trisilicate to form a plastic mass, and the latter granulated while drying it.

2. Process according to claim 1, wherein a further adsorbent is added to the magnesium trisilicate.

3. Process according to claim 1, wherein there is used as film-forming agent shellac, a polyacryl or methacryl derivative, a polyethylene glycol, a polyvinyl derivative or a cellulosic derivative which is soluble in alcohol or water.

4. Process according to claim 3, wherein the film-forming agent used is polyvinyl-pyrrolidone.

5. Process according to claim 1, wherein the film-forming agent is used in a concentration of 0.2 to 20 parts by weight for every 10 parts by weight of furanoside.

6. Process according to claim 5, wherein the film-forming agent is used in a concentration of 1 to 5 parts by weight for every 10 parts by weight of furanoside.

7. Process according to claim 6, wherein the film-forming agent is used in a concentration of 2 to 4 parts by weight for every 10 parts by weight of furanoside.

8. Process according to claim 1, wherein the magnesium trisilicate is used in a concentration of 5–20 parts by weight for every 10 parts by weight of furanoside.

9. Process according to claim 8, wherein the magnesium trisilicate is used in a concentration of 8–15 parts by weight for every 10 parts by weight of furanoside.

10. Process according to claim 9, wherein the magnesium trisilicate is used in a concentration of 10–12 parts by weight for every 10 parts by weight of furanoside.

11. Process according to claim 2, wherein colloidal silicic acid or cellulose is used as a further adsorbent.

12. Process according to claim 11, wherein the additional adsorbent is used in a concentration of 1–20 parts by weight for every 10 parts by weight of furanoside.

13. Process according to claim 12, wherein the additional adsorbent is used in a concentration of 1–10 parts by weight for every 10 parts by weight of furanoside.

14. Process according to claim 13, wherein the additional adsorbent is used in a concentration of 4–6 parts by weight for every 10 parts by weight of furanoside.

15. Process according to claim 1, wherein the furanoside used is ethyl-3,5,6-tri-O-benzyl-D-glucofuranoside.

16. Process according to claim 1, wherein the furanoside used is ethyl-3-O-propyl-5,6-di-O-para-chlorobenzyl-D-glucofuranoside.

References Cited

UNITED STATES PATENTS

| | | | |
|---|---|---|---|
| 3,157,634 | 11/1964 | Drugy et al. | 260—210 |
| 3,494,913 | 2/1970 | Rossi | 260—210 |
| 3,530,113 | 9/1970 | Rossi | 260—210 |
| 3,538,077 | 11/1970 | Rossi | 260—210 |
| 3,542,761 | 11/1970 | Rossi | 260—210 |
| 3,594,474 | 7/1971 | Mueller | 424—180 |

SHEP K. ROSE, Primary Examiner

U.S. Cl. X.R.

264—117; 424—78, 180